US006563917B2

(12) United States Patent
Sabinson et al.

(10) Patent No.: US 6,563,917 B2
(45) Date of Patent: *May 13, 2003

(54) GEOGRAPHICAL CALL ROUTING FOR A NON-EMERGENCY CALLING SERVICE

(75) Inventors: Richard E. Sabinson, San Antonio, TX (US); Gregory Steven Fosburgh, San Ramon, CA (US); Mark Tamasi, St. Louis, MO (US); Brenda S. Thompson, Plano, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/977,697

(22) Filed: Oct. 16, 2001

(65) Prior Publication Data

US 2002/0039411 A1 Apr. 4, 2002

Related U.S. Application Data

(63) Continuation of application No. 09/207,275, filed on Dec. 8, 1998, now Pat. No. 6,330,324.
(60) Provisional application No. 60/069,114, filed on Dec. 9, 1997.

(51) Int. Cl.[7] .............................. H04M 3/42; H04M 7/00
(52) U.S. Cl. .......................... 379/221.08; 379/207.12; 379/216.01; 379/221.09; 379/221.12
(58) Field of Search ....................... 379/201.01, 207.02, 379/207.12, 211.01, 211.02, 212.01, 216.01, 265.01, 265.02, 266.01, 355.01, 355.04, 221.08, 221.09, 221.12

(56) References Cited

U.S. PATENT DOCUMENTS 4,757,267 A    7/1988   Riskin
5,481,603 A    1/1996   Gutierrez et al.
5,506,897 A    4/1996   Moore et al.
5,524,146 A    6/1996   Morrisey et al.
5,533,107 A    7/1996   Irwin et al.
5,588,048 A   12/1996   Neville
5,592,541 A    1/1997   Fleischer, III et al.
5,805,688 A    9/1998   Gillespie et al.
5,867,570 A    2/1999   Bargout et al.
5,878,126 A    3/1999   Velamuri et al.
6,075,853 A    6/2000   Boeckman et al.
6,097,802 A    8/2000   Fleischer et al.
6,185,289 B1   2/2001   Hetz et al.
6,330,324 B1  12/2001   Sabinson et al.  ...... 379/221.08

OTHER PUBLICATIONS

"Understanding SS7, AIN and LNP", Telecommunications Reseach Associates, pp. 2–5 to 5–20, Jul. 1998.

Berman, R.K. et al., "Perspectives On The AIN Architecture", IEEE Communications Magazine, Feb. 1992, pp. 27–32.

*Primary Examiner*—Harry S. Hong
(74) *Attorney, Agent, or Firm*—Greenblum & Bernstein, P.L.C.

(57) ABSTRACT

A method, in an advanced intelligent communications system, for routing a call based on the location of the calling party number where a telephone call to an abbreviated destination telephone number is received at a service switching point. The service switching point determines if the abbreviated destination number is a triggering number, and if so, notifies a service control point of receipt of the telephone call. The location of the calling party number is determined from location information related to the service switching point. The appropriate routing of the telephone call is determined based on the location of the calling party number. Call routing information regarding the telephone call is sent to the service switching point where the service switching point routes the telephone call to a destination number or a default announcement.

20 Claims, 12 Drawing Sheets

FIGURE 5

| 1.<br>Signal<br>Point Code | 2.<br>Region | 3.<br>Split<br>Yes or<br>No | 4.<br>Routing<br>Telephone<br>Number | 5.<br>Customer Billing<br>Number |
|---|---|---|---|---|
| 433 111 112 | DALLAST | N | 214-670-5112 | 214-670-1234 |
| 433 111 113 | DALLAST | N | 214-670-5112 | 214-670-1234 |
| 433 111 114 | DALLAST | N | 214-670-4567 | 214-670-1234 |

FIGURE 6

| ZIP Code | routing Telephone Number |
|---|---|
| 63141-1000 | 314-839-1234 |
| 63141-1001 | 314-839-1234 |
| 63141-1004 | 314-839-1234 |
| 63142-1 | 214-670-5111 |
| 63143-200 | 214-670-5111 |
| 63145 | 214-670-5111 |
| 63146-5000 | 314-576-3000 |

FIGURE 8

| 1.<br>Signal<br>Point Code | 2.<br>Region | 3.<br>Split<br>Yes or<br>No | 4.<br>Routing<br>Telephone<br>Number | 5.<br>Customer Billing<br>Number |
|---|---|---|---|---|
| 433 111 112 | DALLAST | N | 214-670-5112 | 214-670-1234 |
| 433 111 113 | DALLAST | N | 214-670-5112 | 214-670-1234 |
| 433 111 114 | DALLAST | N | 214-670-4567 | 214-670-1234 |
| 529 300 111 | STLOUISM | N | 314-247-1234 | 314-235-1234 |
| 447 333 122 | STLOUISM | Y | BLANK | BLANK |
| 445 222 111 | STLOUISM | Y | BLANK | BLANK |
| 531 000 111 | TULSAO | N | 918-249-1234 | 918-249-1234 |
| 445 234 161 | TULSAO | Y | BLANK | BLANK |
| 445 234 162 | KANSASCM | Y | BLANK | BLANK |
| 446 456 111 | KANSASCM | Y | BLANK | BLANK |

FIGURE 9

| AIN ANNC ID # | DMS Phrase ID # | 5ESS Phrase ID # | 1AESS Phrase ID # | Announcement Phrase List |
|---|---|---|---|---|
| 99 | 571<br>571 | 050<br>051 | 650<br>651 | We're sorry.<br>We cannot complete your call as dialed. |

FIGURE 10

| 311 Test Calls | Initial Coin Deposit? | Coin Return? | 311 | 1+311 | 0+311 |
|---|---|---|---|---|---|
| 1AESS POTS | na | na | Triggers and Routes correctly | Triggers and Routes correctly | No Trigger, routes to Annc. |
| 1AESS Coin | No | na | Triggers and Routes correctly | Triggers and Routes correctly | No Trigger, routes to Annc. |
| 1AESS Coin | Yes | Yes | Triggers and Routes correctly | Triggers and Routes correctly | No Trigger, routes to Annc. |
| 5ESS POTS | na | na | Triggers and Routes correctly | Triggers and Routes correctly | Triggers and Routes correctly |
| 5ESS Coin | No | na | Triggers and Routes correctly | Triggers and Routes correctly | Triggers and Routes correctly |
| 5ESS Coin | Yes | Yes | Triggers and Routes correctly | Triggers and Routes correctly | Triggers and Routes correctly |
| DMS POTS | na | na | Triggers and Routes correctly | No Trigger, prefix dialed in error Annc. | Triggers and Routes correctly |
| DMS Coin | No | na | Triggers, post-query routes to Treat= NOCN | No Trigger, prefix dialed in error Annc. | Triggers and Routes correctly |
| DMS Coin | Yes | → | Triggers and Routes correctly. Coin not returned | No Trigger, prefix dialed in error Annc. Coin returned | Triggers and Routes correctly Coin returned |

FIGURE 11

| INFORMATION | TABLE NO | VALUE | REMARKS |
|---|---|---|---|
| RECORD DESCRIPTION | 000 | 004a0000 | |
| RECORD HEADER | 00 | aa | |
| STRUCTURE CODE | 0 | 40220 | AIN Structure Code |
| CALL TYPE | 1 | 1AESS & <br> AXE    5ESS    DMS <br> 047    067    047 | Flat Rate |
| TIMING INDICATOR | 1 | 0 | |
| SENSOR TYPE | 2 | 0 | |
| SENSOR ID | 3 | 0 | |
| RECORDING OFFICE TYPE | 4 | 0 | |
| RECORDING OFFICE ID | 5 | 0 | |
| CONNECT DATE | 6 | YYMMDDc | |
| TIMING INDICATOR | 7 | 0000c | |
| STUDY INDICATOR | 8 | 0000000c | |
| COMPLETION INDICATOR | 280 | 00Xc | X=1 - Answer |
| OPERATOR ACTION | 11 | 0c | |
| SERVICE FEATURE | 12 | 027 | |
| ORIGINATING NPA <br> ORIGINATING NUMBER | 13 <br> 14 <br> - | 1AESS & <br> AXE    5ESS    DMS <br> 311    000    000 <br> 000    311    000 <br> 0000   0000   0311 | NPA <br> NXX <br> Line Number |
| OVERSEAS INDICATOR | 15 | | |
| TERMINATING NPA | 16 | XXXc | NPA of RTN |
| TERMINATING NUMBER | 16 | NXXYYYYc | Number of RTN |
| CONNECT TIME | 18 | HHMMSSTc | |
| ELAPSED TIME | 19 | 0MMMMMXXTc | |
| SERVICE LOGIC ID | 77 | 031100101 | SLPID FOR 311 |
| MODULE CODE | 88 | 029c | |
| ALTERNATE BILLING NUMBER | 138 | XXXCXXYYYYC | Billing Number |
| MODULE CODE | 88 | 307c | |
| LINE NUMBER TYPE | 423 | 005C | Calling Party Number |
| LINE NUMBER | 16 | XXXc | Originating NPA |
| LINE NUMBER | 17 | NXXYYYYc | Calling Party Number |
| MODULE CODE | 88 | 000c | |

GEOGRAPHICAL CALL ROUTING FOR A NON-EMERGENCY CALLING SERVICE

CROSS-REFERENCE TO RELATED APPLICATION

This is a continuation of U.S. application Ser. No. 09/207,275, filed Dec. 8, 1998, now issued as U.S. Pat. No. 6,330,324 on Dec. 11, 2001, which claims the benefit of U.S. Provisional Application No. 60/069,114, filed on Dec. 9, 1997, the contents of which are expressly incorporated by reference herein in their entireties.

1. FIELD OF THE INVENTION

The present invention generally relates to systems for routing telephone calls to appropriate numbers. More particularly, the present invention relates to an Advanced Intelligent Network (AIN) based system and methods for routing telephone calls based on the location of the calling party.

2. ACRONYMS

The written description provided herein contains acronyms which refer to various communication services and system components. Although known, use of several of these acronyms is not strictly standardized in the art. For purposes of the written description herein, acronyms will be defined as follows:

AIN—Advanced Intelligent Network
AMA—Automatic Message Accounting
CCIS—Common Channel Interoffice Signaling
CO—Central Office
CPN—Calling Party Number
CPR—Call Processing Record
DN—Dialed Number Trigger
DRS—Data Reporting System
EO—End Office (EO)
ISCP—Integrated Service Control Point
LSP—Local Service Provider
NPA—Number Plan Area, i.e., area code
NXX—Central Office Code
RTN—Routing Telephone Number
SCE—Service Creation Environment
SCP—Service Control Point
SCCP—Signaling Connection Control Part
SMS—Service Management System
SPC—Signaling Point Code
SS7—Signaling System 7
SSP—Service Switching Point
STP—Signaling Transfer Point
TAT—Terminating Attempt Trigger
TCAP—Transaction Capabilities Applications Protocol

3. DESCRIPTION OF THE RELATED ART

In recent years, a number of new telephone service features have been provided by advanced intelligent communications networks such as an Advanced Intelligent Network (AIN). The AIN evolved out of a need to increase the capabilities of the telephone network architecture to meet the growing needs of telephone service customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN architecture is shown in FIG. 1. As shown in FIG. 1, Central Offices (CO) 10–16 are provided for sending and receiving data messages from an Integrated Service Control Point (ISCP) 20 via a Signaling Transfer Point (STP) 30–34. The data messages are communicated to and from the COs 10–16 and the ISCP 20 along a Common Channel Inter-Office Signaling (CCIS) network 22. Each CO 10–16 serves as a network Service Switching Point (S SP) to route telephone calls between a calling station (e.g., station 40) and a called station (e.g., station 48) through the trunked communications network 24–26. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

While prior AIN or AIN-type intelligent network applications may have provided various features to subscribers and users, these prior applications do not allow users to dial one telephone number and reach a single point of contact for multiple services provided by a subscriber. Current systems and methods require users to identify one of many possible numbers to call depending on the specific information or service desired from the subscriber. This requires users to know the telephone number of all departments or service groups of the subscriber that they need information from.

Moreover, none of the current systems and methods allow a user to dial an abbreviated telephone number to access services from a subscriber. Currently, the user must lookup, write down, or memorize a full seven or more digit number for each department or service group that they may need information from.

Therefore, a system and method is needed that allows users to dial one telephone number and reach a single point of contact for information and services provided by a subscriber, and that provides an abbreviated telephone number that is easy to remember for accessing the single point of contact for services from the subscriber.

SUMMARY OF THE INVENTION

Accordingly, the present invention is directed to a system and method for geographical call routing for a non-emergency calling service that substantially obviates one or more of the problems arising from the limitations and disadvantages of the related art.

It is an object of the present invention to provide an AIN system and method that routs calls to a non-emergency service based on the geographical location of the caller.

It is also an object of the present invention to provide an AIN system and method that allows users to dial one telephone number and reach a single point of contact for services provided by a subscriber.

It is a further object of the present invention to provide an AIN system and method that allows users to dial an abbreviated telephone number that is easy to remember for accessing a single point of contact for services from a subscriber.

Accordingly, one aspect of the present invention is directed to an advanced intelligent communications system for routing telephone calls based on the location of a calling party. The system includes: a plurality of call origination telephones; at least one switching device operatively connected to at least one of the plurality of call origination telephones, the at least one switching device servicing calls placed by at least one calling party using one of the plurality of call origination telephones; a processor operatively connected to the at least one switching device, the processor determining routing of the calls placed by the at least one calling party; a storage device operatively connected to the processor, the storage device containing location information related to the at least one calling party; and at least one destination telephone operatively connected to at least one of the at least one switching device, wherein the processor sends routing information to the at least one switching device for routing calls to one of the at least one destination telephone and a terminating announcement, based on the location of the at least one calling party.

According to another aspect of the present invention, each at least one switching device has an associated signaling point code that is used by the processor to determine the location of the at least one calling party relative to a defined service area.

According to yet another aspect of the present invention, the signaling point code indicates whether the at least one switching device services only calls within the defined service area.

According to a further aspect of the present invention, the signaling point code indicates whether the at least one switching device services calls both within the defined service area and outside of the defined area.

According to another aspect of the present invention, each signaling point code that indicates whether the at least one switching device services only calls within the defined service area, has an associated call routing telephone number.

According to yet another aspect of the present invention, the storage device contains information mapping the signaling point codes to the associated call routing telephone number for the at least one switching device that services only calls within the defined service area.

According to a further aspect of the present invention, for the signaling point codes that indicate the at least one switching device does not service any calls within the defined service area, the processor sends routing information to the at least one switching device to route the call to the terminating announcement.

According to another aspect of the present invention, the storage device contains information indicating whether the signaling point codes represent switching devices that service telephones within the service area.

According to yet another aspect of the present invention, the storage device contains information indicating whether the signaling point codes represent switching devices that service telephones both in the service area and outside the service area.

According to a further aspect of the present invention, the storage device contains information mapping telephone numbers of the at least one calling party to associated zip codes.

According to another aspect of the present invention, the storage device contains information mapping the associated zip codes to call routing telephone numbers.

According to yet another aspect of the present invention, information regarding the processing of the calls placed by the at least one calling party is recorded.

According to a further aspect of the present invention, a report generator generates reports based on the information recorded.

According to another aspect of the present invention, the calls placed by the at least one calling party are to an abbreviated telephone number comprising three digits.

According to yet another aspect of the present invention, the calls placed by the at least one calling party are to "1" plus an abbreviated telephone number comprising three digits.

According to a further aspect of the present invention, the calls placed by the at least one calling party are to "0" plus an abbreviated telephone number comprising three digits.

According to another aspect of the present invention, the defined service area comprises multiple service areas.

According to yet another aspect of the present invention, the at least one switch device comprises at least one of a 5ESS switch, a AXE10 switch, a 1AESS switch, and a DMS100 switch.

According to a further aspect of the present invention, the at least one switching device comprises an AIN switch.

According to another aspect of the present invention, the at least one switching device comprises a non-AIN switch.

According to yet another aspect of the present invention, the at least one switching device is a host switching device that services at least one remote terminal.

According to a further aspect of the present invention, the present invention includes a method for routing a call based on the location of the calling party number in an advanced intelligent communications system that includes: receiving a telephone call at a switching point, the telephone call being from a calling party number to an abbreviated dialed number; determining if the abbreviated dialed number is a triggering number; notifying a service control point of receipt of the telephone call by the switching point if the abbreviated dialed number is a triggering number; classifying the switching point; determining the location of the calling party number; determining the appropriate routing of the telephone call based on the location of the calling party number; sending call routing information regarding the telephone call to the switching point; and routing the telephone call to one of a destination number and a default announcement.

According to another aspect of the present invention, the abbreviated dialed number comprises three digits.

According to yet another aspect of the present invention, the abbreviated dialed number comprises '1' plus three digits.

According to a further aspect of the present invention, the abbreviated dialed number comprises '0' plus three digits.

According to another aspect of the present invention, the classifying includes determining whether the switching point receives telephone calls only from within a defined service area.

According to yet another aspect of the present invention, the classifying includes determining whether the switching point receives telephone calls from both within a defined service area and outside the defined service area.

According to a further aspect of the present invention, the notifying further comprises sending information related to the switching point to the service control point.

According to another aspect of the present invention, the determining if the abbreviated dialed number is a triggering number includes comparing the information related to the switching point to location information.

According to yet another aspect of the present invention, the notifying includes sending information related to the calling party number to the service control point.

According to a further aspect of the present invention, the determining of the location comprises comparing a zip code of the calling party number to location information.

According to another aspect of the present invention, the determining of the location comprises determining the location of the service switching point.

According to yet another aspect of the present invention, the determining of the appropriate routing comprises determining the zip code of the location of the calling party number.

According to a further aspect of the present invention, the routing comprises routing the telephone call to the destination number closest to the calling party number.

According to another aspect of the present invention, the default announcement recites a message and terminates the call.

According to yet another aspect of the present invention, the present invention includes an advanced intelligent communications system for routing telephone calls based on the location of a calling party that includes: calling means for originating a telephone call; switching means operatively connected to the calling means, the switching means servicing calls placed by a calling party using the calling means; processor means operatively connected to the switching means, the processor means determining routing of the calls placed by the calling party; storage means operatively connected to the processor means, the storage means containing location information related to the calling party; and at least one destination site operatively connected to at least one of the switching means, wherein the processor means sends routing information to the switching means for routing calls to one of the at least one destination site and a terminating announcement, based on the location of the calling party.

According to a further aspect of the present invention, the switching means has an associated signaling point code that is used by the processor means to determine the location of the calling party.

According to another aspect of the present invention, the signaling point code indicates whether the switching means services only calls from within a defined service area.

According to yet another aspect of the present invention, the signaling point code indicates whether the switching means services calls from both within the defined service area and from outside of the defined area.

According to a further aspect of the present invention, each signaling point code that indicates whether the switching means services only calls from within a defined service area, has an associated call routing telephone number.

According to another aspect of the present invention, the storage means contains information mapping the signaling point codes to the associated call routing telephone number for the switching means that services only calls from within the defined service area.

According to yet another aspect of the present invention, for the signaling point codes that indicate the switching means does not service any calls from within the defined service area, the processor means sends routing information to the switching means to route the call to the terminating announcement.

According to a further aspect of the present invention, the storage means contains information indicating whether the signaling point codes represent switching means that service calls from within the service area.

According to another aspect of the present invention, the storage means contains information indicating whether the signaling point codes represent switching means that service calls from both within the service area and outside the service area.

According to yet another aspect of the present invention, the storage means contains information mapping telephone numbers of the calling party to associated zip codes.

According to a further aspect of the present invention, the storage means contains information mapping the associated zip codes to call routing telephone numbers.

According to another aspect of the present invention, information regarding the processing of the calls placed by the at least one calling party is recorded.

According to yet another aspect of the present invention, the invention includes means for generating reports based on the information recorded.

According to a further aspect of the present invention, the calls placed by the calling party are to an abbreviated telephone number comprising three digits.

According to another aspect of the present invention, the calls placed by the calling party are to an abbreviated telephone number comprising "1" plus three additional digits.

According to yet another aspect of the present invention, the calls placed by the calling party are to an abbreviated telephone number comprising "0" plus three additional digits.

According to a further aspect of the present invention, the present invention includes an advanced intelligent communications system for routing a call based on the location of the calling party number that includes: receiving means for receiving a telephone call at a switching point, the telephone call being from a calling party number to an abbreviated dialed number; determining means for determining if the abbreviated dialed number is a triggering number; notifying means for notifying a service control point of receipt of the telephone call by the switching point if the abbreviated dialed number is a triggering number; classifying means for classifying the switching point; second determining means for determining the location of the calling party number; third determining means for determining the appropriate routing of the telephone call based on the location of the calling party number; sending means for sending call routing information regarding the telephone call to the switching point; and routing means for routing the telephone call to one of a destination number and a default announcement.

According to another aspect of the present invention, the abbreviated dialed number includes a telephone number that comprises three digits.

According to yet another aspect of the present invention, the abbreviated dialed number comprises a telephone number that comprises '1' plus three additional digits.

According to a further aspect of the present invention, the abbreviated dialed number includes a telephone number that comprises '0' plus three additional digits.

According to another aspect of the present invention, the classifying means determines whether the switching point receives telephone calls only from within a defined service area.

According to yet another aspect of the present invention, the classifying means determines whether the switching point receives telephone calls from both within a defined service area and outside the defined service area.

According to a further aspect of the present invention, the notifying means further sends information related to the switching point to the service control point.

According to another aspect of the present invention, the first determining means further compares the information related to the switching point to location information.

According to yet another aspect of the present invention, the notifying means further sends information related to the calling party number to the service control point.

According to a further aspect of the present invention, the second determining means compares a zip code of the calling party number to location information.

According to another aspect of the present invention, the second determining means determines the location of the service switching point.

According to yet another aspect of the present invention, the third determining means determines the zip code of the location of the calling party number.

According to a further aspect of the present invention, the routing means routes the telephone call to the destination number closest to the calling party number.

According to another aspect of the present invention, the default announcement recites a message and terminates the call.

Additional features and advantages of the present invention will be set forth in the description to follow, or may be learned by practice of the invention. The objectives and other advantages of the invention will be realized and attained by the methods particularly pointed out in the written description and claims hereof together with the appended drawings.

It is to be understood that both the foregoing general description and the following detailed description are exemplary and explanatory, and are intended to provide further examples and an explanation of the invention as claimed.

The accompanying drawings are included to provide a further understanding of the invention and are incorporated in and constitute a part of this specification, illustrating one embodiment of the invention. The drawings, together with the description, serve to explain the principles of the invention.

BRIEF DESCRIPTION OF THE DRAWINGS

The present invention is illustrated by way of example, and not by way of limitation, by the figures of the accompanying drawings in which like reference numerals refer to similar elements, and in which:

FIG. 5 is an exemplary Single Point Code Table according to the present invention;

FIG. 6 is an exemplary Zip Code to Routing Telephone Number table according to the present invention;

FIG. 8 shows an exemplary multiple service area SPC table according to the present invention;

FIG. 9 is an exemplary table showing switch specific default announcement translations;

FIG. 10 is an exemplary table showing POTS and coin call disposition according to the present invention.

FIG. 11 shows an exemplary AMA record;

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Many telephone services may be provided using an AIN or AIN-type network for centralized control of telephone services offered to subscribers, as opposed to localized control of services at the Central Office (CO). An AIN system is provided through interaction between switching points and other systems supporting AIN logic.

1. AIN Network

The geographical call routing for a non-emergency call service according to the present invention may be implemented using AIN Release 0.1 protocols and advanced intelligent network capabilities which are provided by a telephone company, i.e., programmable service control points (SCPs), central offices equipped with AIN service switching point (SSP) features, and existing Common Channel Interoffice Signaling (CCIS) networks. The Signaling System 7 (SS7) network is a widely used CCIS network that provides two-way communication of Transaction Capabilities Application Protocol (TCAP) formatted data messages between the SCP and the STP. The telephone network essentially employs an upper-level software network through the STPs and the SCP. The software resides over the hardware to check the call route and the availability of connection prior to hardware connection.

Figure 1:
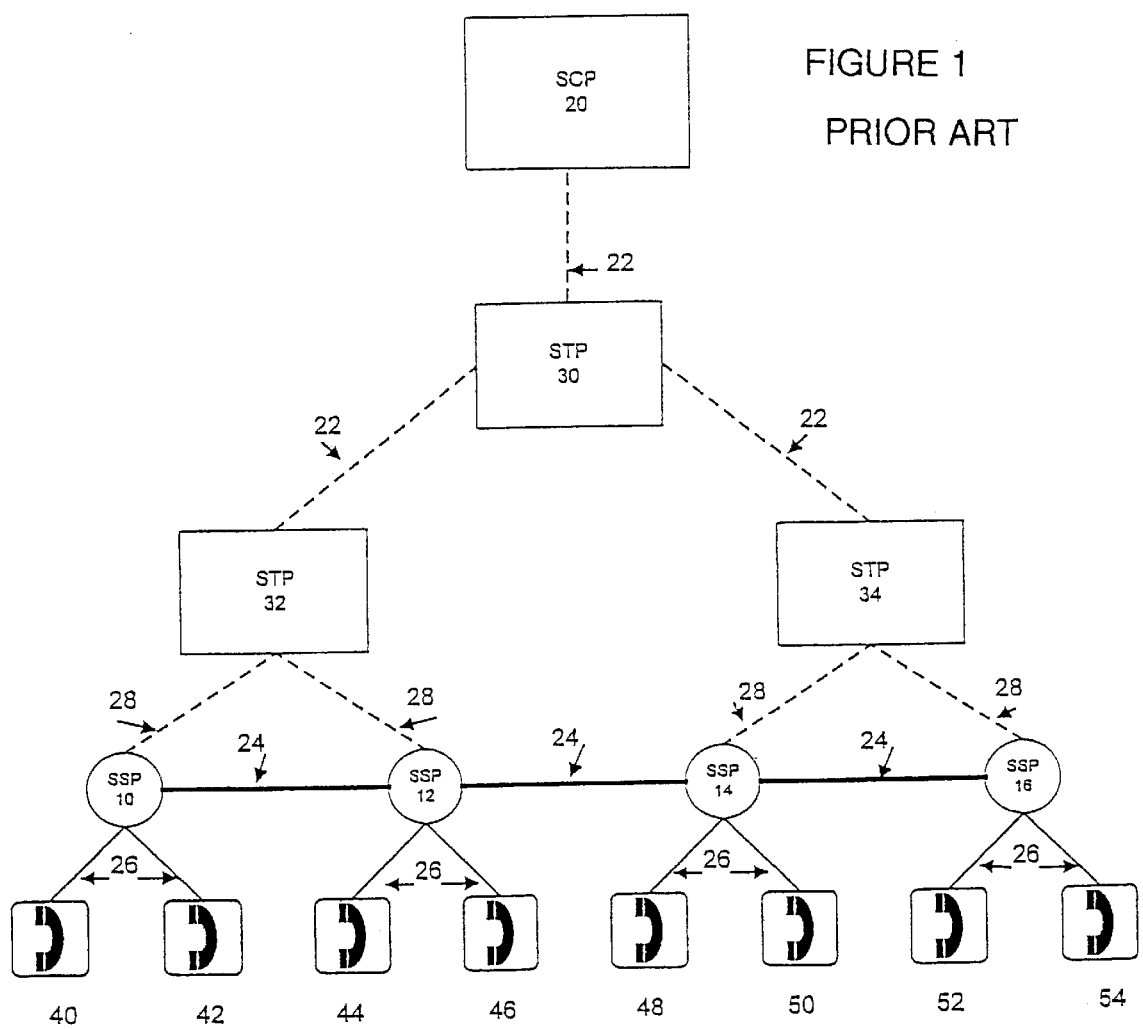
FIG. 1 shows a block diagram of an exemplary prior art AIN system.
Figure 2:
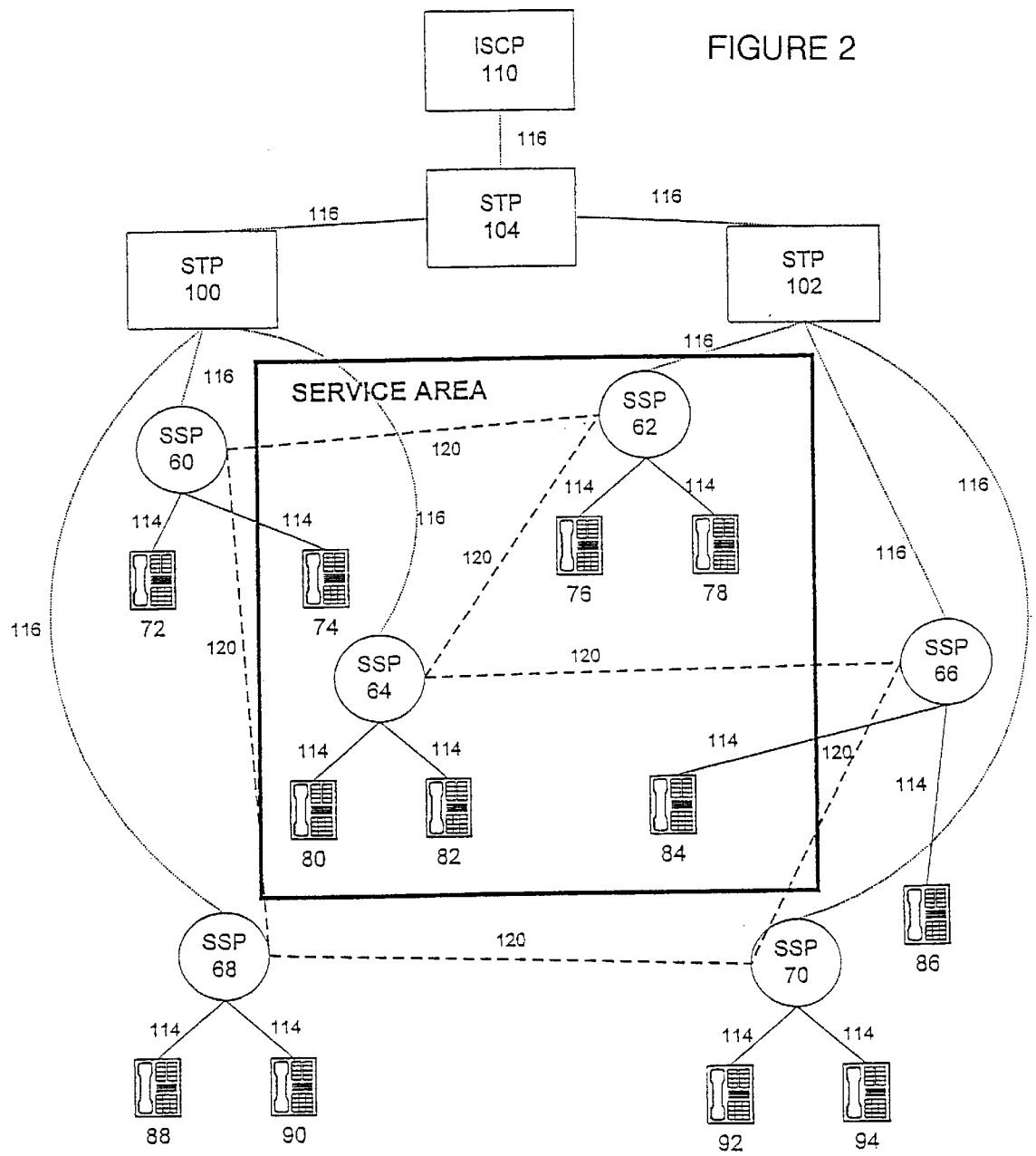
FIG. 2 is a block diagram showing an AIN geographical call routing for a non-emergency calling service according to the present invention.

FIG. 2 illustrates a general block diagram of an Advanced Intelligent Network (AIN) in which a system and method for geographical call routing for a non-emergency calling service is embodied in accordance with the present invention. In FIG. 2, local telephone lines 114 connect a plurality of individual locations 72–94 in each geographic area to the closest Central Office (CO), or End Office (EO) which contains Service Switching Points 60–70. An End Office is a Central Office that is connected to the telephone equipment of a user. In FIG. 2, each CO is shown as a Service Switching Point (SSP) 60–70.

The SSPs may include, but are not limited to, 5ESS, AXE10, 1AESS, and DMS-100 switches. If 5ESS switches are utilized, then these switches should be equipped with generic 5E9 (or higher) and provided with the necessary trigger requirements (discussed below) in order to serve subscribers. Any 1AESS switches should be equipped with generic 1AE12.06 (or higher) and provided the necessary trigger requirements in order to serve subscribers. For DMS switches, DMS release (NA008), and the necessary trigger features should be provided. The corresponding software release for the ISCP is Release (5.0). For AXE10 switches, AXE 10 8.0 and the necessary trigger features should be provided. Future software releases on these network elements should not impact the service.

For purposes of illustration, only six SSPs are shown in FIG. 2. However, more (or less) than six SSPs may be utilized. The SSPs 60–70 are programmable switches which: recognize AIN-type calls; launch queries to an Integrated Service Control Point (ISCP) 110; and, receive commands and data from the ISCP 110 to further process and route AIN-type calls. The SSPs 60–70 are connected by trunked communication lines 120 which are used to connect and carry telecommunication signals, e.g., voice and/or data, from a calling party to a called party. When one of the SSPs 60–70 is triggered by an AIN-type call, the SSP formulates an AIN service request and responds to call processing instructions from the network element in which the AIN service logic resides. A trigger event is the combination of the occurrence of receipt of a call, and the called telephone number satisfying the trigger criteria administered in the SSP, which invokes AIN or switch-based feature involvement in an originating or terminating call. A trigger occurs when the SSP determines that it must query the ISCP to continue processing a call. Triggers can occur from both the originating and terminating telephone numbers. The AIN service logic may reside in a database at ISCP 110. A Call Processing Record (CPR) is a graphical representation of service logic. The CPR shows the flow of decisions and actions that are made as a call is processed.

In FIG. 2, the SSPs 60–70 are equipped with Common Channel Inter-Office Signaling (CCIS) capabilities (or, alternatively, Common Channel Signaling (CCS)), e.g., Signaling System 7 (SS7), which provides for two-way communications of data messages between each SSP 60–70 and the ISCP 110 via SS7 links 116. The data messages are formatted in accordance with the Transaction Capabilities Applications Protocol (TCAP). As shown in FIG. 2, SSPs 60–70 are connected to Signaling Transfer Points (STPs) 100–104 by SS7 links 116. The connections by links 116 to the STPs are for signaling purposes, and allow the SSPs to send and receive messages to and from the ISCP 110. Each of the STPs can be connected to a number of other STPs. For purposes of illustration in FIG. 2, SS7 links 116 are shown as connecting STPs 100 and 102 to a regional STP 104 and connecting the regional STP 104 to ISCP 110.

Figure 3:
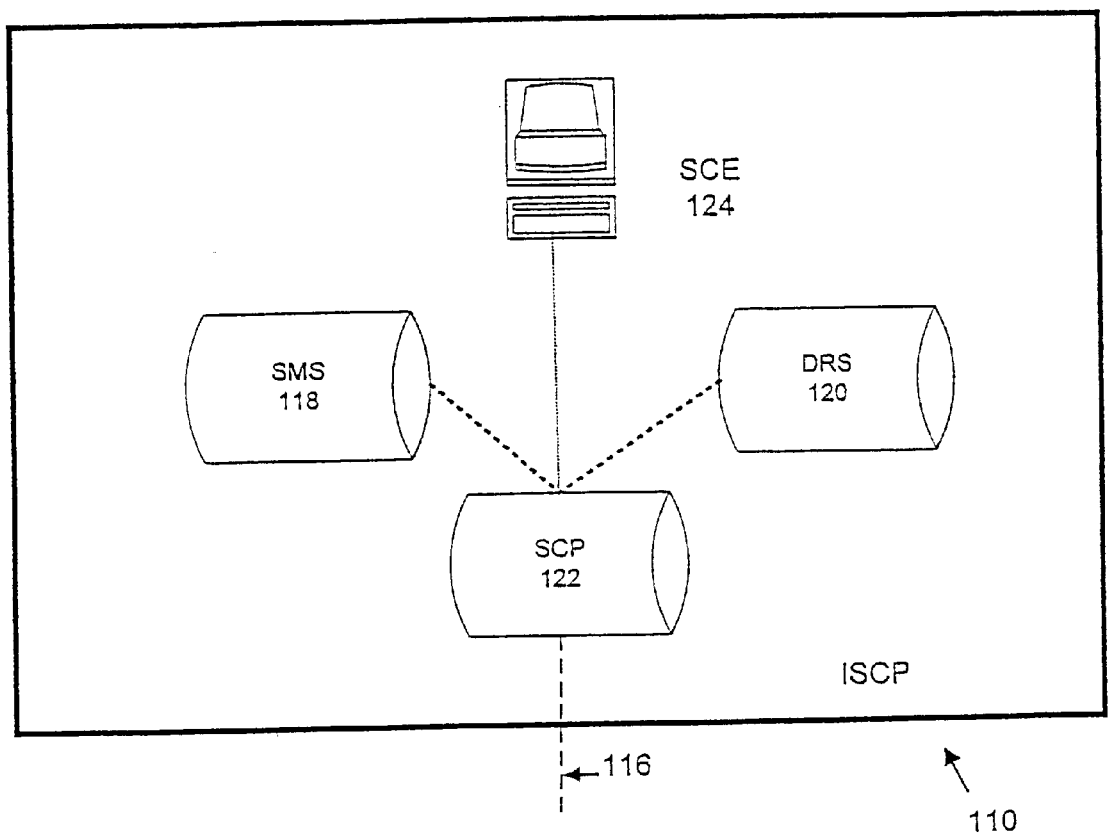
FIG. 3 is a block diagram of an Integrated Service Control Point according to the present invention.

FIG. 3 shows an ISCP 110 that may include a Service Management System (SMS) 118, a Data and Reports System (DRS) 120, a programmable Service Control Point (SCP) 122, and a Service Creation Environment (SCE) 124. The SCE 124 is a terminal that may be implemented to work with SMS 118 to create, modify, and load services into a database in the SCP 122. The SCP 122 executes software-based service logic and returns call routing instructions to the SSPs. The SMS 118 and DRS 120 may be provided for compiling calling information to be used for billing and administrative purposes. By way of example, ISCP 110 may be implemented with the Bellcore Integrated Service Control Point (ISCP), loaded with ISCP software Version 3.4, available from Bell Telephone Laboratories, Inc., Murray Hill, N.J.

In a typical AIN-type system, when a non-AIN telephone call is initiated from, for example, party A at location 88 in FIG. 2, the call is directed to the end office 68 serving the calling location 88. While each of the end offices 60–70 may not be AIN-type SSPs, they are SS7 SSPs, and, therefore, part of the software data network. When the end office 68 receives the originating call, the call is suspended and the software network takes over the routing and connecting of the call. Normal call processing begins when an originating station 88 is off-hook and the end office 68 receives dialed digits (the telephone number of the party at station 88) from the originating station. End office 68 analyzes the digits and determines the call type, i.e., intraswitch or interswitch. An intraswitch call, i.e., a local call, directly connects calling station 88 with called station 90 without any querying outside of end office 68, that serves both stations.

When the called station, for example, a party at station 82, is not served by the same end office as originating station 88, further processing may be necessary. In this situation, and assuming an entire SS7 network, the originating call from station 88 is suspended at the end office 68, which further sends a query message through one or more of the STPs 100 and 102, and/or regional STP 104 to ISCP 110 to offer termination of the call. The query message is routed to terminating end office 64, the end office serving called station 82. If station 82 is off-hook, i.e., busy, terminating end office 64 responds to the query from end office 68 that the call cannot be connected, and a busy signal is transmitted to calling station 88. If station 82 is on-hook, end office 64 responds to the query of originating end office 68 by transmitting a ringback signal to calling station 88, which is then serially connected through the trunked communication lines 120 to end office 64 and from end office 64 to called station 82.

Advanced Intelligent Network (AIN) call processing differs from standard telephone call processing in that a query to a centralized database or service logic, e.g., ISCP 110, is triggered by an AIN application. In AIN-type call processing, an SSP is responsible for identifying calls associated with AIN services, detecting when conditions for AIN service involvement are met, formulating service requests for call processing instructions, and responding to the instructions received. As with normal call processing, when the call is suspended at the calling party's end office, this end office may send a data message, via the SS7 links 116, to the STPs to establish the call route. AIN services are created by assigning appropriate SSP call suspension points, known as AIN "triggers", accessed via customer lines or telephone numbers, and accessing customer or service-specific logic in the ISCP 110. A Dialed Number (DN) Trigger is an AIN 0, office-based, originating trigger which invokes AIN features when the trigger criteria are met. Trigger criteria are met when a call is placed to the designated NPA codes, NPA-NXX codes or NPA-NXX-XXXX codes. Ideally, AIN service should be triggered at the earliest possible point in the call, i.e., at the originating CO, however, service providers may only be able to provision the network with AIN triggers residing in the COs serving the subscribing customer or at an intermediate point on one of the connecting trunks. The SSPs launching the AIN queries are SSPs 60–66, because SSPs 68 and 70 do not service any telephones within the service area. Thus, if an originating call through SSP 60 encounters an AIN trigger, i.e., a call requiring AIN service involvement, the SSP 60 suspends call processing, then queries the ISCP 110 through the STPs 100 and 104 over the SS7 links 116.

The ISCP 110 executes software based service logic programs stored in the SCP 122 to perform subscriber functions, and returns a response to the originating end office with call routing instructions. The AIN service application may be stored in SCP 122, or another element containing or consisting of an ISCP database. New services may be created by assigning appropriate SSP AIN triggers to customer lines or telephone numbers to access customer and/or service-specific logic in ISCP 110. The SS7 message routing should be devised to minimize the need for data administration at the local and regional STPs.

When ISCP 110 receives a query, the intelligent network screening service logic will be executed. Call data may be collected and recorded in DRS 120. For example, the ISCP 110 may contain resident service software that collects the calling (originating) telephone number, called (terminating) telephone number, the date, and the time of each query to the ISCP 110 A call processing record (CPR) that is stored within SCP 122, may also be provided. The CPR may contain the service logic for network screening and call routing.

The ISCP service logic must have detailed knowledge of trunk group identifiers, route index numbers, and individual SSPs in order to service a customer. This information may be obtained during a service order process and may require that translation groups be consulted to complete such service order/provisioning information.

2. Geographical Call Routing for a Non-emergency Calling Service System

An embodiment of the geographical call routing for a non-emergency calling service system according to the present invention that will be used for illustration is a geographical call routing for a non-emergency calling service system provided by a city to its residents. In the system, a caller may place a call to a non-emergency abbreviated telephone number to get information regarding city resources, activities, or services, etc. The abbreviated number may be three digits, such as 311, or "1" or "0" plus three digits; e.g. 1 311 or 0 311. The caller, or user, dials the 311 number to get answers to questions regarding information or services. Normally, the user would have to dial the number for the specific service, or the number for the office handling questions related to the information desired.

The non-emergency call routing system service is provided by a telephone service provider. The telephone service provider may or may not be the local telephone service provider of the subscriber to the service. In the above example, the city is a subscriber to the AIN-based geographical call routing system. A resident of the city is a user of the subscriber services provided by the system. If a user desired information regarding a city service, the user would normally call the telephone number associated with the department or agency that has information for that service.

The present invention provides the user with the ability to dial only a single abbreviated telephone number to access information for all services provided by the subscriber.

Since only a single telephone number is used for information regarding all services, the frequency of calls to this number will be greater than if several telephone numbers, one for each department, is used. The present invention takes calls made to the abbreviated number and routes them to one of one or more destinations based on the location of the calling party. The location of the calling party is determined relative to a defined service area where the subscriber provides the abbreviated non-emergency call routing services. Only calls from users within this service area will be routed to one of the destinations that answer calls made to the non-emergency number. The location of the SSP that services the originating call from the calling party is used to determine routing of the call. The calling party number (CPN) is also used to determine how to route the call when the SSP location is not sufficient.

Figure 4:
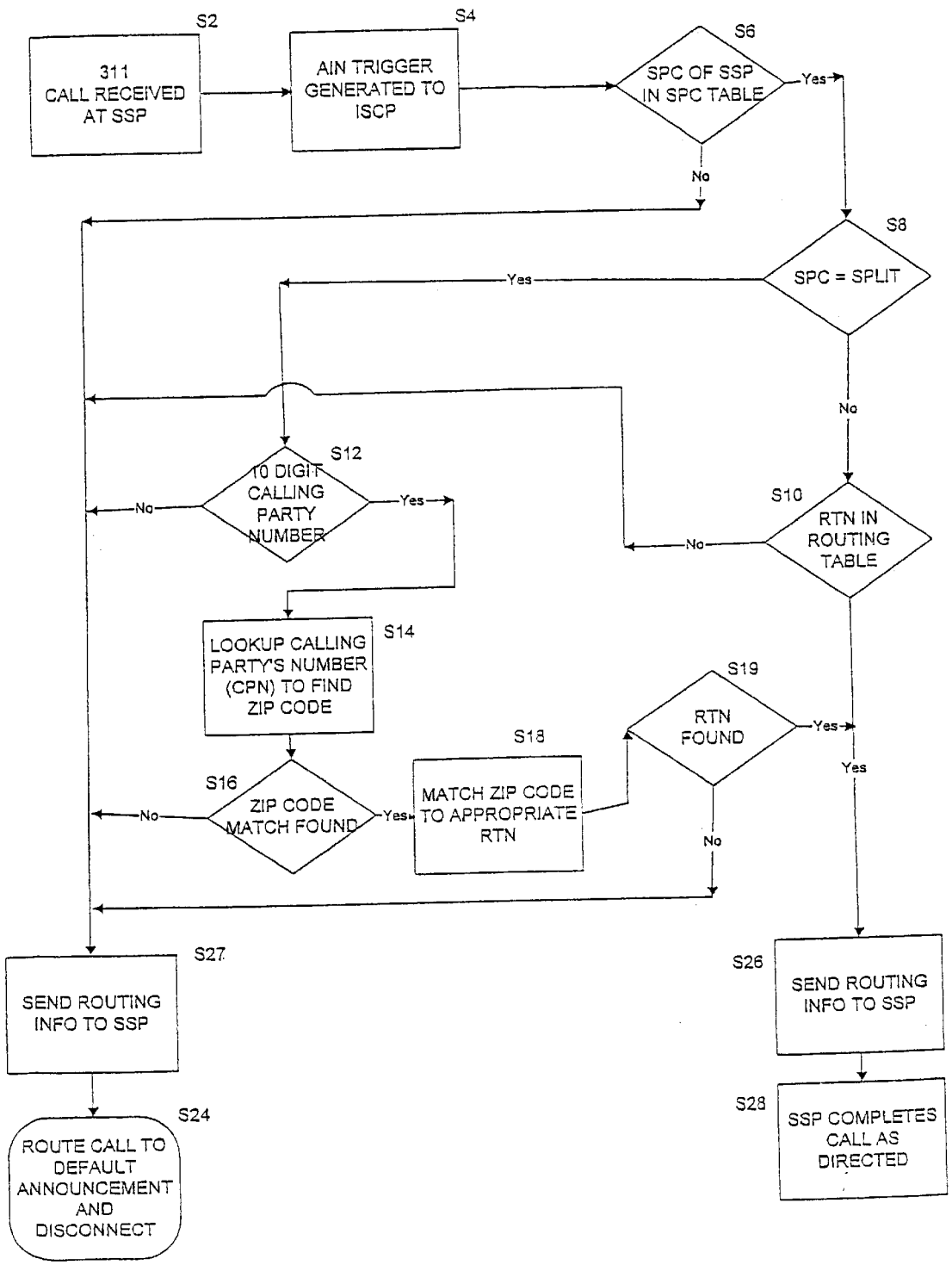
FIG. 4 is a flow diagram of geographical call routing for a non-emergency calling service according to the present invention.

FIG. 4 is a flowchart of the geographical non-emergency call routing system according to the present invention. A telephone call to the 311 number is received at a SSP (S2) that services calls for the CPN that placed the call. An AIN trigger is generated (S4) for calls placed to telephone numbers having digits 311, 1+311, or 0+311. Information related to the call is sent to ISCP 110 from the SSP. The SSP will send information related to both the calling party, and the SSP. This information will include the CPN, as well as a Signaling Point Code (SPC). A SPC is associated with each SSP that services telephone numbers in the service area. The SPC relates to the location of the SSP. The SPC also identifies whether the SSP services only telephone numbers within the service area, or whether the SSP services telephone numbers both in the service area, and outside of the service area. ISCP 110 uses the SPC in determining the routing of the call.

ISCP 110 will determine if the SPC is contained in a SPC table contained in ISCP 110 (S6). The SPC table maps each SPC to a Routing Telephone Number (RTN). The subscriber to the non-emergency call routing system may provide this mapping to the service provider. FIG. 5 is an exemplary SPC Table according to the present invention. The first column of FIG. 5 contains the SPC values identifying the SSPs. Column two of FIG. 5 shows a descriptive field designating what municipality, region, or area the SSP services based on the SPC. In the exemplary table in FIG. 5, the region represents a city where the last character in the region field represents the state that the city is located in. The third column has a SPLIT variable that indicates whether the associated SSP services only telephone numbers that are within the service area, or services both telephone numbers within the service area and telephone numbers outside of the service area. If the SSP only services telephone numbers that are within the service area, the SPLIT variable will be "N". If the SSP services both telephone numbers within the service area and telephone numbers outside of the service area, the SPLIT variable will be "Y".

If the SPC, of the SSP that received the call, is not contained in the SPC table, the call is routed to a default announcement and terminated. Generally, the SPC of the SSP will not be in the SPC table if the SSP only services telephones located outside of the defined service area. SSP 68 and SSP 70 in FIG. 2 are examples of SSPs that do not service any telephone numbers within the defined service area. The service area is defined in FIG. 2 by thick solid lines forming a square. Therefore, a calling party from outside of the service area, for example outside of the city limits, would not have access to the services provided by the subscriber city or municipality.

If the SPC is in the SPC table, and indicates that the telephones serviced by the SSP are all within the service area, service logic in ISCP 110 will identify the routing telephone number (RTN) associated with the SPC of the SSP as shown in FIG. 5. The service logic will send this routing information to the SSP, and the SSP will route the call accordingly. Column 5 of FIG. 5 shows an associated customer billing number for each RTN. The billing number is a telephone number related to the subscriber of the geographical non-emergency call routing service. This number is printed on billing information sent to the subscriber.

If the SPC indicates that the SSP is divided, or split (S8), i.e. the SSP services telephones both in the service area, and telephones outside of the service area, the ISCP service logic performs additional processing to determine the appropriate routing of the call. The service logic verifies that a ten digit CPN has been received from the SSP (S12). If a ten digit CPN has not been received, the ISCP will send routing information to the SSP to route the call to a default announcement and terminate the call (S24).

However, if a ten digit CPN has been received, the service logic will attempt to identify a zip code associated with the CPN (S14). This can be accomplished many ways. For example, a list of CPNs and associated zip codes may be contained in a database. The service logic would then send the CPN to the database to retrieve the associated zip code. The service logic may also, however, use a lookup table that contains a list of CPNs and their associated zip codes. Zip codes may vary in length from 5 digit zip codes to more than five digits.

If no zip code is found for the CPN (S16), the service logic will cause the ISCP to send routing information to the SSP (S27) directing the SSP to route the call to a default announcement and disconnect the call (S24). If a zip code match is found for the CPN (S16), the service logic then determines the associated RTN for the zip code (S18). ISCP 110 will contain information such as that shown in FIG. 6. FIG. 6 is an exemplary Zip Code Routing table that lists zip codes and their associated routing telephone numbers. If an associated routing telephone number is not found, the service logic will cause the ISCP to send routing information to the SSP (S27) directing the SSP to route the call to a default announcement and disconnect the call (S24). If an associated routing telephone number is found, ISCP 110 would send routing information to the SSP that contains the associated RTN (S26).

Therefore, as shown in FIG. 4, once the SSP receives the routing directions from ISCP 110, the SSP will either route the call to the appropriate routing telephone number for the calling party number (S28), or route the call to a default announcement and disconnect the call (S24).

The geographical call routing for a non-emergency call service system according to the present invention may also be implemented for multiple service areas. For example, it is possible for several different areas to provide the non-emergency calling service for their residents.

Figure 7:
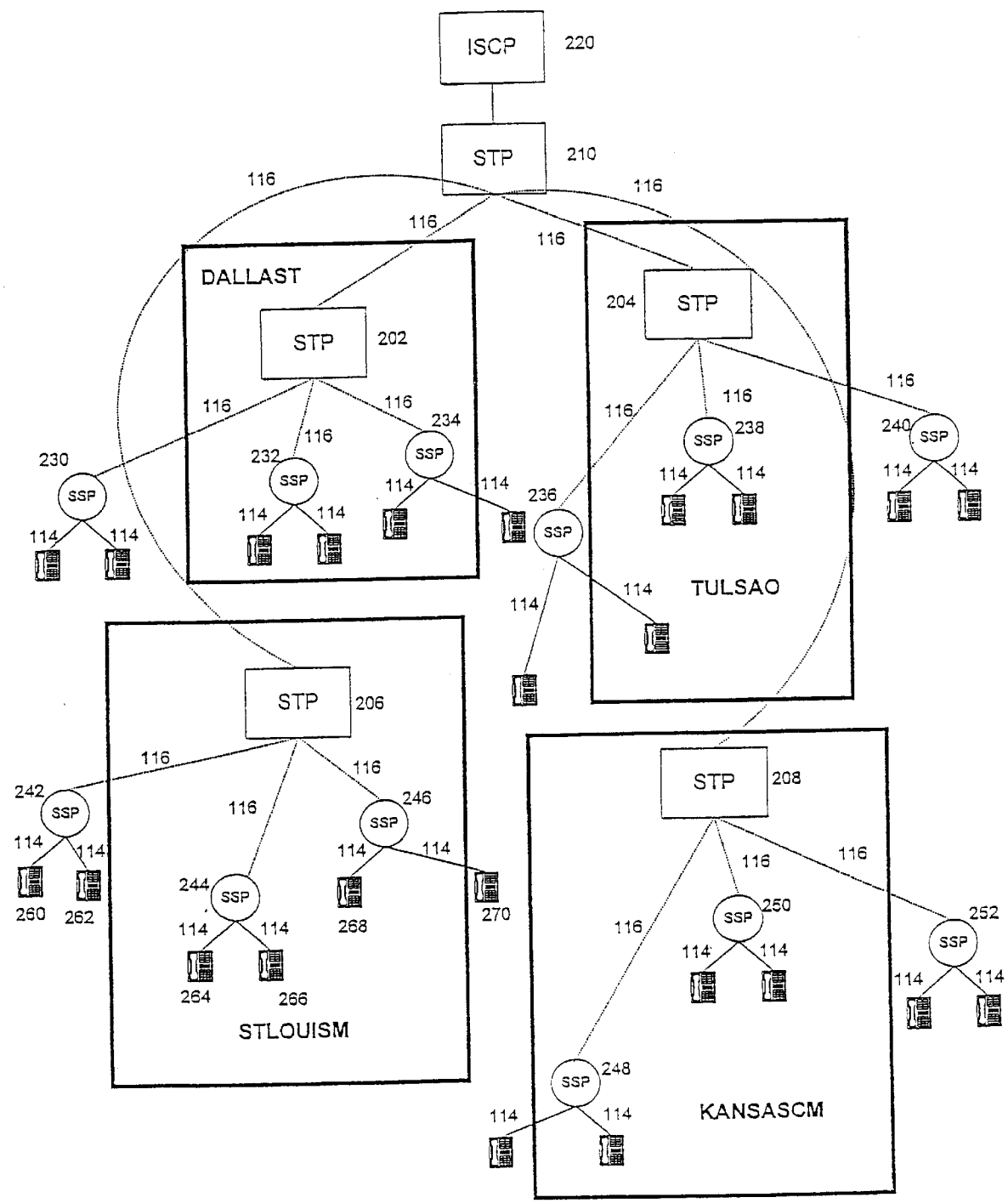
FIG. 7 is a block diagram of an AIN geographical call routing for a non-emergency calling service with multiple service areas according to the present invention.

FIG. 7 is a diagram showing an embodiment of the present invention where the non-emergency call routing system has multiple service areas (denoted by the thick black rectangles). In this embodiment, the geographical call routing for a non-emergency call service according to the present invention still determines the appropriate routing of the call based on the geographical location of the calling party. A 311 call from a calling party will be routed to the appropriate destination or routing telephone number based on which service area the calling party number is located in or serviced by, and by the location of the calling party relative to the service area. The SPC of each SSP defines the location of the SSP, and which service area the SSP services. If the SSP services telephones both within one service area, and telephones within another service area or no service area, then the associated zip code of the calling party number will be used to determine the routing of the call. If the zip code is not in the zip code routing table, then the call will be routed to a default announcement.

Four separate geographical areas, each one denoted by the thick box-shaped outlines, and the labels DALLAST, TULSAO, STLOUISM, and KANSASCM are shown in FIG. 7. STPs 202–208 are connected to ISCP 220 through STP 210. Connections between SSPs and STPs (e.g. SS7 links 116), and SSPs and calling party telephones (e.g. local telephone lines 114) are the same as shown in FIG. 2 discussed previously. In FIG. 7, only one STP is shown in each geographical area, however, there may be multiple STPs in each area, and more SSPs and calling party telephones than shown, and still be within the spirit and scope of the present invention. ISCP 220 contains the SPC values for all SSPs that service calls from all service areas that subscribe to the geographical non-emergency calling service system. The ISCP also contains all call routing telephone numbers associated with each service area.

For example, calls placed by a calling party at stations 260, 262, or 270 to the non-emergency number calling service would be routed to a default announcement and terminated because these stations are not within the STLOUISM service area, or any other service area. The SPC of SSP 242 will not have an associated call routing telephone number.

Calls placed by a calling party at stations 264 or 266 will cause a trigger in SSP 244. Since SSP 244 services calls only from stations within the STLOUISM service area, the SPC of SSP 244 will likely have an associated routing telephone number for the STLOUISM service area. The routing telephone number for the SPC of SSP 244 will be sent to SSP 244, and the calls routed accordingly.

Calls placed by stations 268 and 270 will cause a trigger in SSP 246. The SPC of SSP 246 will be SPLIT since SSP 246 services stations both within the STLOUISM service area and stations outside of the STLOUISM service area. For calls to the non-emergency number placed at stations 268 and 270, the calling party number will be sent to the ISCP to find an associated zip code. If the zip code is not found, the call will be routed to a default announcement and terminated. If a zip code is found, the associated routing telephone number will be sent to SSP 246, and the call routed accordingly. Since station 268 is within the STLOUISM service area, the SPC of station 268 will likely have an associated zip code in ISCP 220 with an associated routing telephone number. Conversely, since station 270 is not within the STLOUISM service area, the SPC of station 270 will likely not have an associated routing telephone number.

An exemplary routing table with SPCs and associated routing telephone numbers for multiple service areas is shown in FIG. 8. In this example, call routing numbers for the four different service areas, denoted by DALLAST, STLOUISM, TULSAO, and KANSASCM, are shown. This table is similar to that shown in FIG. 5 discussed previously, except FIG. 5 only related to a single service area. The SPC Table in FIG. 8 is for a system that services multiple service areas, as shown by the different regions that represent different cities. The last character in the region field represents the state that the city is located. As shown in FIG. 8, there can be different SPCs for the same service area, and also different routing telephone numbers for calls from the same service area. The term "BLANK" means that there is no information for this entry.

3. Trigger Requirements

The present invention maybe implemented with, for example: 5ESS, AXE10, 1AESS, and/or DMS-100 switches. A trigger will be set against the digits 311, 1+311, and 0+311 in the SSP switches. The 311 trigger should be activated only in those SSPs that serve telephone numbers located within the service area. If a trigger is generated, a query is launched to the ISCP 110. The 311 digits will be translated into ten-digit numbers in each of these switches.

The non-emergency 311 service may be used by telephones that are serviced by non-AIN equipped switches. In these cases, in order to provide the 311 service, it will be necessary to route 311 calls to a nearby compatible 5ESS, AXE10, 1AESS, or DMS-100 SSP. Once the 311 number is received by one of these SSPs, a trigger will be generated, and the call processed accordingly.

For the terminating announcement, AIN Announcement ID #99 is translated in each 311 participating SSP according to the switch specific features as shown in FIG. 9. The announcement may be recorded and installed in any SSP that is part of the non-emergency calling service system. The terminating announcement is not limited to AIN Announcement ID #99, but may be any message desired, recorded, and installed for the terminating announcement.

a. 5ESS Switch Types

For a non-emergency 311 number served by a 5ESS switch, a N11 trigger is encountered and an Info_Analyzed query message is generated with a trigger criteria type of N 1. The trigger on the 5ESS switch is a 10-digit trigger. The trigger may be based upon AIN Release 0.1 protocol and may preferably require that AIN Release 0.1 query call variables be converted into common call variables by a CPR (Calling Party Record) in the ISCP 110. If the 5ESS switch is utilized, then these switches should be equipped with Generic 5E9.1 (or higher) and provided with the necessary trigger requirements in order to serve subscribers.

b. 1AESS Switch Types

For a non-emergency 311 number served by a 1AESS switch, a NPA (3/6/10) trigger is encountered and an Info_Analyzed query message is generated with a trigger criteria type of NPA.

The trigger on the 1AESS switch may be a dialed line number (DN) trigger based upon a 10 digit virtual number. The trigger may be based upon the AIN Release 0.1 protocol and may preferably require AIN Release 0.1 query call variables to be converted into common call variables by a CPR in the ISCP 110. Further, if 1AESS switches are employed, they should preferably be equipped with Generic 1AE12.03 (or higher) and provided with the necessary trigger requirements in order to serve subscribers.

c. DMS-100 Switch Types

For a non-emergency 311 number served by a DMS switch, a NPA (3/6/10) trigger is encountered and an Info_Analyzed query message is generated with a trigger criteria type of NPA. The trigger of the DMS-100 switch may utilize a termination attempt trigger (TAT) based upon the AIN Release 0.1 protocol and may preferably require AIN Release 0.1 query call variables to be converted into common call variables by a CPR in the ISCP 110. A TAT is a subscribed trigger that is assigned to a telephone number. AIN features are invoked because of an attempt to terminate a call on the dialed number which subscribes to this trigger. These were first available in AIN 0.1. If DMS-100 switches are used, DMS release NA008 (or higher) should preferably be provided.

d. AXE 10 Switch Types

For a non-emergency 311 number served by a AXE 10 switch, a N11 trigger is encountered and an Info_Analyzed query message is generated with a trigger criteria type of N11. If AXE 10 switches are used, AXE 10 8.0 (or higher) should preferably be provided.

4. Non-AIN switches

In the non-emergency call routing system according to the present invention, switches that are not equipped for AIN can be used. The non-AIN switch is assigned an SSP (Hub SSP) that is AIN equipped, and part of the non-emergency call routing system. If a call to the non-emergency call routing service is received by the non-AIN switch, and the non-AIN switch services telephones that the non-emergency call routing system is providing service for, the call will be routed from the non-AIN switch to the Hub SSP. A trigger will then be generated, and the call processed the same as calls placed to AIN SSPs used in the non-emergency call routing system. The non-AIN switch should be assigned to an AN Hub SSP with the same type non-emergency number routing table information in the ISCP.

The call processing of 311 calls to a non-AIN switch is determined based on the locations of both the non-AIN switch, and the Hub SSP. If both the non-AIN switch and the Hub SSP are entirely within the service area, the SPLIT variable will be "N", and only the SPC Table will be accessed to determine the appropriate routing of the call. However, if either the non-AIN switch or the Hub SSP are outside of the service area, the SPLIT variable will be "Y", and the ZIP Code Routing table will be used to determine the appropriate routing of the call.

5. Hosts/Remotes

The non-emergency call routing system according to the present invention can have host SSPs that service remote terminals. Remote terminals are line termination points that service one or more telephones. The remote terminals, however, are "dumb" terminals with no programming or processing means. Interoffice calls placed from telephones serviced by remote terminals are always routed to a host SSP. The host SSP then processes the call to determine the appropriate routing of the call. Remote terminals are not connected to trunk lines, and cannot route interoffice calls. Interoffice calls placed by a telephone number to another telephone number serviced by a remote terminal are always routed to the host SSP that services the remote terminal, and then from the host SSP to the destination end office.

Calls from telephones serviced by remote terminals to the 311 non-emergency number are processed similar to the way calls are processed for 311 calls to non-AIN SSPs. The call processing of 311 calls from a remote terminal is determined based on the locations of both the remote terminal, and the host SSP. If both the remote terminal and the host SSP are entirely within the service area, the SPLIT variable will be "N", and only the SPC Table will be accessed to determine the appropriate routing of the call. If, however, either the remote terminal or the host SSP are outside of the service area, the SPLIT variable will be "Y", and the ZIP Code Routing table will be used to determine the appropriate routing of the call.

6. Local Service Providers

A subscriber who subscribes to the non-emergency call routing system, provided by a service provider, may desire to provide the non-emergency call routing service to users in an area that has telephone service provided by a telephone service provider (such as a local service provider) that is different from the provider that provides the non-emergency call routing system services. In this case, the local service provider (LSP) may provide service to some portion of the service area where the non-emergency call routing service is provided.

The local service provider may handle the non-emergency call by routing the call from a calling party to a routing telephone number, or the local service provider may route the non-emergency call to an SSP of the non-emergency call routing service provider where a trigger will be generated. If the LSP handles the non-emergency call, the LSP will have a database or some other means for mapping the calling party number to an associated telephone number for routing of the call, defined by the subscriber. If the calling party number does not have an associated call routing number, the LSP will route the call to a default announcement and terminate the call. If the LSP does not choose to handle calls placed to the non-emergency call routing service, all calls received by the LSP that have been placed to the non-emergency telephone number will be routed to an SSP that is part of the system of the service provider providing the non-emergency call routing services.

In this case, a trigger will be generated and the call routed like other non-emergency calls received by the system.

7. POTS and Coin Call Dispositions

FIG. 10 shows the call disposition based on the type of switch, the number dialed, and whether the call is placed from a Plain Old Telephone System (POTS), or from a coin telephone. The left most column lists the types of switches. The two columns to the right of this show whether a coin deposit is required, and whether the coin will be returned after it has been deposited. The next three columns represent the telephone number digits dialed that may initiate a trigger according to the non-emergency calling system of the present invention.

8. Usage Monitoring and Billing

The geographical call routing for a non-emergency calling service system according to the present invention monitors usage of the non-emergency calling service network. A distributed network function (in the SSPs) measures usage of the network and produces Automatic Message Accounting (AMA) records containing usage information. This information is used to obtain a count of completed calls to each 311 subscriber. This allows each subscriber to be billed on a number of completed calls basis. However, this information may be used for other purposes, and/or the subscriber billed based on different criteria related to the service, and still be within the spirit and scope of the present invention.

An AMA record is created in the SSP for each call made to the non-emergency number. The ISCP sends, to each SSP, information informing the SSP whether to create an AMA record for the call, and if so, the appropriate AMA parameters needed for the SSP to create the AMA record. This may include, among other items, a slip id (SLPID), as shown in Table 1 below, that tells the switch type, and the AMA originating number. The SLPID is then made part of the AMA record. An exemplary AMA record is shown in FIG. 11. The first column in the AMA record shown in FIG. 11 is the title of the information collected. The second column is used to refer to tables that may reside in the ISCP if a table structure is used to collect this information. The third column is the information collected, and the fourth column contains any comments or additional information related to the information in column three. This information may be used for a variety of purposes, such as identifying high usage SSPs, or for billing the subscriber for the service.

TABLE 1

| | AMA Originating Number | |
|---|---|---|
| Switch Type | NPA | Number |
| 1AESS & AXE | 311 | 0000000 |
| 5ESS | 000 | 3110000 |
| DMS | 000 | 0000311 |

In accordance with the present invention and as discussed previously, a billing telephone number may be associated with each routing telephone number. For each routing number associated with a SPC of an SSP, there may be an associated billing number. Also, when the SPC indicates SPLIT, for each zip code that has an associated call routing telephone number, an associated billing telephone number may exist. Therefore, when the ISCP receives the SPC and the CPN from the SSP to determine routing of the call, both the routing telephone number and the billing telephone number may be obtained simultaneously.

9. Data and Reports System

The ISCP in the geographical call routing for a non-emergency calling system according to the present invention passes call information to a Data and Reports System (DRS). The DRS stores call information related to calls to the non-emergency calling service system. For example, the DRS may store information related to: an occurrence of an event, the flow of decisions and actions that are made as a call is processed, the time of a call, the date of a call, and the calling party number. This information may be used to generate reports or billing information for the service provider. The information in these reports may also be useful, for example, if a call cannot be routed, or if an error condition arises.

Figure 12:
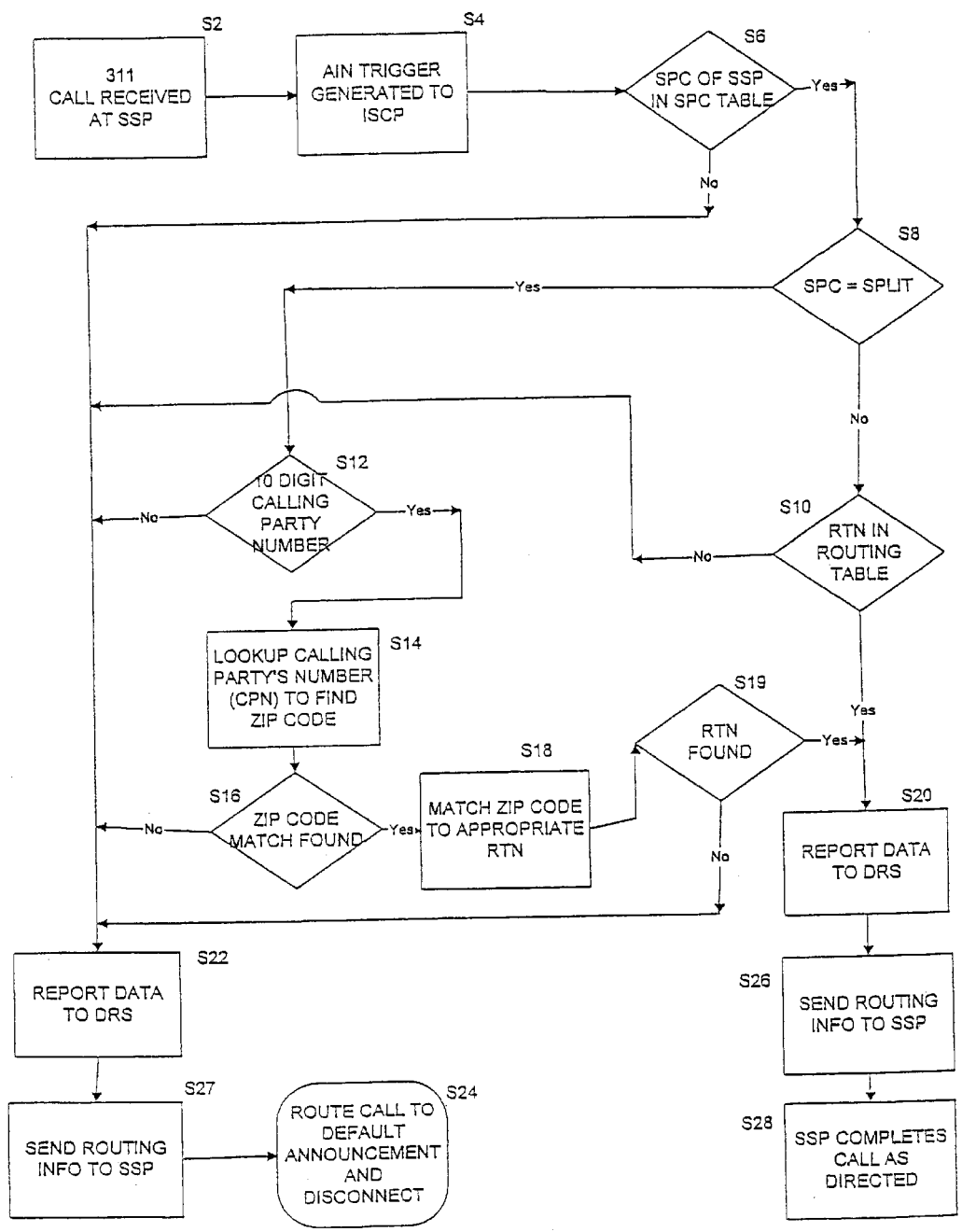
FIG. 12 is a flow diagram of the geographical call routing for a non-emergency calling service with DRS according to the present invention.

FIG. 12 is a diagram of the AIN geographical call routing for a non-emergency calling service that includes the DRS for recording information related to the handling of the call. Reference step numbers in FIG. 12 that are the same as those in FIG. 4 represent the same activity as in FIG. 4. FIG. 12 shows additional steps S20 and S22 representing the DRS function. As shown in FIG. 12, whenever a call to the non-emergency number cannot be routed to a routing telephone number, i.e. the call is routed to a default announcement and terminated, information related to the call is gathered and recorded by the DRS in step S22. Also, when the call can be routed to a routing telephone number, call related information is recorded by the DRS in step S20. A call disposition will be determined by the ISCP based on the handling of each call to the non-emergency number. The call disposition will be sent to the DRS. Some exemplary call dispositions are shown in Table 2.

TABLE 2

| NUMBER | DISPOSITION |
|---|---|
| 1 | Call routed to the 311 answer point without accessing Zip Code Table |
| 2 | No CPN delivered |
| 3 | CPN delivered, but not in Zip Code Table |
| 4 | CPN delivered, CPN in Zip Code Table, but an associated Zip code is not in Zip Code Table |
| 5 | Time-out condition |
| 6 | Return Error message |
| 7 | SCCP routing error |
| 8 | SPC not in SPC Table - Call originating from a subscriber that is not in the customer's defined service area, or error in SPC Table |
| 9 | No RTN in SPC Table |
| 10 | No RTN in Zip Code Table - Call originating from a subscriber that is not in the customer's defined service area, or error in Zip Code Table |
| 11 | Call routed to the RTN answer point after accessing Zip Code Table |

Call disposition 1 occurs after the "Yes" branch of step S10. Call disposition 2 occurs after the "No" branch of step S12. Call disposition 3 occurs after exiting step S14 if the CPN is not found in the Zip Code Table. Call disposition 4 occurs after the "No" branch of step S16. Call dispositions 5, 6, or 7 may occur after exiting step S14. The SCCP is part of the SS7 protocol that provides communication between signaling nodes by adding circuit and routing information to the signaling message Call disposition 8 occurs after the "No" branch of step S6. Call disposition 9 occurs after the "No" branch of step S10. Call disposition 10 occurs after the "No" branch of step S19. Call disposition 11 occurs after the "Yes" branch of step S19.

The disposition of each call will be sent to the DRS and recorded. The recorded dispositions will be monitored by the service provider to identify any problems with the system and for service assurance to subscribers.

10. Interactions with Other AIN Type Services

The service provider may provide the geographical non-emergency call routing service system to a subscriber in area that is serviced by another AIN type service. This AIN type service may be provided by a LSP and consist of, for example, the LSP receiving operator, directory assistance, and local calls on their own network. The LSP may elect to receive some or all of these type calls on the network provided by the non-emergency call routing service system provided by the service provider.

If the LSP elects to receive not to receive local calls, i.e. these calls are processed by the non-emergency call routing service system, calls to the 311 number would generate a trigger, and the calls would be processed and routed by the non-emergency call routing service system as usual. If, however, the LSP elects to receive and process local calls itself, calls to the 311 number would be received by the non-emergency call routing service system and routed to the LSP via the LSP's own network. For this situation, no trigger would be generated, and it is the responsibility of the LSP to properly route the 311 call.

The non-emergency call routing service system according to the present invention also supports Disaster Routing Service. This is an intelligent call forwarding type of service. For example, if a police station had no one available to answer calls to its numbers because of some disaster or other situation, the police station could activate the Disaster Routing Service and then all calls made to the normal telephone number of the police station would be forwarded to another location. A service such as this can be supported for the 311 non-emergency number. If a call is placed to the 311 number, processing occurs as normal, and call routing information is sent back to the SSP. At the SSP, the received RTN would cause another trigger in the SSP, and cause the SSP to forward the call to another number accordingly.

The non-emergency call routing service system according to the present invention also supports Local Number Portability (LNP). This AIN based service, mandated by the FCC, provides the ability of users of telecommunications services to retain, at the same location, existing telephone numbers when switching from one service provider to another. If a call is placed to the 311 number, a trigger would be generated and the call processed normally. After the RTN is sent to the originating SSP, normal LNP service call processing would occur.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the spirit and scope of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An advanced intelligent communications system for routing telephone calls based on a location of a calling party, said system comprising:

at least one split switching device operatively connected to at least one of a plurality of call origination telephones, said at least one split switching device servicing calls placed by at least one calling party using one of said plurality of call origination telephones, the at least one split switching device servicing call origination telephones located within at least one service area and call origination telephones located outside the at least one service area;

wherein the split switching device routes calls to a destination based on the location of the at least one calling party.

2. The system according to claim 1, wherein each split switching device has an associated signaling point code that is used by a processor to determine whether a call is from a split switching device.

3. The system according to claim 2, wherein each signaling point code associated with each split switching device has an associated call routing telephone number.

4. The system according to claim 1, wherein information regarding the processing of the calls placed by the at least one calling party is recorded.

5. The system according to claim 4, further comprising a report generator that generates reports based on the information recorded.

6. The system according to claim 1, wherein said calls placed by the at least one calling party are to an abbreviated telephone number comprising three digits.

7. The system according to claim 1, wherein said calls placed by the at least one calling party are to 1 plus an abbreviated telephone number comprising three digits.

8. The system according to claim 1, wherein the call is routed to a service destination when the location information indicates the at least one calling party is within the at least one service area, and the call is routed to a terminating announcement when the location information indicates the at least one calling party is not within the at least one service area.

9. The system according to claim 1, wherein said at least one split switching device comprises an AIN switch.

10. The system according to claim 1, wherein said at least one split switching device comprises a non-AIN switch.

11. The system according to claim 1, wherein said at least one split switching device is a host switching device that services at least one remote terminal.

12. A method for routing telephone calls based on a location of a calling party, said method comprising:

receiving a telephone call at a split switching device, said split switching device servicing calls placed by at least one calling party using one of a plurality of call origination telephones, the at least one split switching device servicing call origination telephones located within at least one service area and call origination telephones located outside the at least one service area;

notifying a service control point of receipt of the telephone call by the split switching device;

classifying the split switching device as a split switching device at the service control point; and routing calls from the split switching device to a destination based on the location of the at least one calling party relative to the at least one service area.

13. The method according to claim 12, wherein the calling party places a call by dialing an abbreviated dialed number comprising three digits.

14. The method according to claim 12, wherein the calling party places a call by dialing an abbreviated dialed number comprising 1 plus three digits.

15. The method according to claim 12, wherein the calling party places a call by dialing an abbreviated dialed number comprising 0 plus three digits.

16. The method according to claim 12, wherein the notifying further comprises sending information related to the switching point to the service control point.

17. The method according to claim 12, wherein the routing comprises routing the telephone call to a destination number corresponding to a closest destination to the calling party.

18. The method according to claim 12, wherein the call is routed to a service destination when the location information indicates the at least one calling party is within the at least one service area, and the call is routed to a terminating announcement when the calling party is not within the at least one service area.

19. An advanced intelligent communications system for routing telephone calls based on a location of a calling party, the system comprising:

at least one split switching device operatively connected to at least one of a plurality of call origination telephones, the at least one split switching device servicing calls placed by at least one calling party using one of the plurality of call origination telephones, the at least one split switching device servicing call origination telephones located within at least one service area and call origination telephones located outside the at least one service area;

at least one switching device operatively connected to at least one of the plurality of call origination telephones, the at least one switching device servicing call origination telephones located within a single service area;

a storage device containing location information of the at least one calling party using calling devices operatively connected to the at least one split switching device; and a processor operatively connected to the at least one split switching device and to the storage device, the processor determining routing of the calls placed by the at least one calling party and determining whether each call is from the at least one split switching device, wherein, when the call is determined to be from the at least one split switching device, the processor sends routing information to the at least one split switching device for routing the call.

20. The advanced intelligent communications system according to claim 19, wherein the call is routed to a service destination when the location information indicates the at least one calling party is within the at least one service area, and the call is routed to a terminating announcement when the calling party is not within the at least one service area.

* * * * *